United States Patent
Cahill et al.

(10) Patent No.: US 10,723,342 B2
(45) Date of Patent: Jul. 28, 2020

(54) ARBITRATION OF MULTIPLE SYSTEMS USING SHARED COMPONENTS

(71) Applicant: Goodrich Corporation, Charlotte, NC (US)

(72) Inventors: Eric Daniel Cahill, Troy, OH (US); Paul R. Burte, Clayton, OH (US); Efrem E. Ayichew, Troy, OH (US); Lane B. Robbins, Pleasant Hill, OH (US); Marc Georgin, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 309 days.

(21) Appl. No.: 15/808,376

(22) Filed: Nov. 9, 2017

(65) Prior Publication Data
US 2019/0023253 A1    Jan. 24, 2019

Related U.S. Application Data

(60) Provisional application No. 62/432,208, filed on Dec. 9, 2016.

(51) Int. Cl.
| | |
|---|---|
| *B60T 17/18* | (2006.01) |
| *B60T 17/22* | (2006.01) |
| *B60T 8/17* | (2006.01) |
| *B60T 7/12* | (2006.01) |
| *B60T 8/171* | (2006.01) |
| *B60T 11/28* | (2006.01) |

(Continued)

(52) U.S. Cl.
CPC .............. *B60T 17/221* (2013.01); *B60T 7/12* (2013.01); *B60T 8/171* (2013.01); *B60T 8/1703* (2013.01); *B60T 11/28* (2013.01); *B64C 25/44* (2013.01); *B60T 2270/402* (2013.01); *B64C 25/34* (2013.01)

(58) Field of Classification Search
USPC ...................................... 701/3–12, 29.1–34.4
See application file for complete search history.

(56) References Cited

U.S. PATENT DOCUMENTS

| | | | | |
|---|---|---|---|---|
| 4,965,879 | A | * | 10/1990 | Fischer, Jr. ........... B64C 27/325 244/17.11 |
| 5,036,455 | A | * | 7/1991 | Atwood .................... G06F 1/30 714/10 |

(Continued)

FOREIGN PATENT DOCUMENTS

| | | |
|---|---|---|
| DE | 4227157 | 3/1993 |
| EP | 2878501 | 6/2015 |

(Continued)

OTHER PUBLICATIONS

European Patent Office, European Search Report dated May 30, 2018 in Application No. 172064 73.5-1012.

*Primary Examiner* — Jonathan L Sample
(74) *Attorney, Agent, or Firm* — Snell & Wilmer L.L.P.

(57) ABSTRACT

A brake control system (BCS) may comprise a first controller, a second controller in electronic communication with the first controller, and a valve comprising a first coil and a second coil. The first controller may be configured to actuate the valve via the first coil. The second controller may be configured to actuate the valve via the second coil. The first controller may be configured to disable the second controller to take over control of the valve.

20 Claims, 3 Drawing Sheets

(51) Int. Cl.
*B64C 25/44* (2006.01)
*B64C 25/34* (2006.01)

(56) References Cited

U.S. PATENT DOCUMENTS

| | | | | |
|---|---|---|---|---|
| 5,050,940 | A * | 9/1991 | Bedford | B60T 8/1703 188/181 C |
| 6,183,051 | B1 * | 2/2001 | Hill | B60T 8/00 303/122.03 |
| 6,513,885 | B1 * | 2/2003 | Salamat | B60T 8/1703 303/122.09 |
| 6,938,183 | B2 * | 8/2005 | Bickel | G06F 11/1658 714/12 |
| 7,949,898 | B2 * | 5/2011 | Tung | G06F 15/16 714/23 |
| 8,620,507 | B2 * | 12/2013 | Akutsu | B60L 50/16 701/22 |
| 9,387,840 | B1 * | 7/2016 | Cahill | B60T 8/1703 |
| 2004/0239173 | A1 * | 12/2004 | Williams | B64C 25/44 303/3 |
| 2005/0192733 | A1 * | 9/2005 | Dellac | B60T 8/00 701/70 |
| 2008/1330730 | | 6/2008 | Griffith et al. | |
| 2008/0257656 | A1 * | 10/2008 | Skinner | B60T 13/662 188/1.11 E |
| 2008/2585480 | | 10/2008 | May et al. | |
| 2009/0014261 | A1 * | 1/2009 | Edelson | B64C 25/405 188/156 |
| 2010/0090058 | A1 * | 4/2010 | Cahill | B64F 5/60 244/111 |
| 2010/0292889 | A1 * | 11/2010 | Cahill | B60T 8/885 701/29.1 |

FOREIGN PATENT DOCUMENTS

| | | |
|---|---|---|
| WO | 2007120267 | 10/2007 |
| WO | 2008097260 | 8/2008 |

* cited by examiner

ARBITRATION OF MULTIPLE SYSTEMS USING SHARED COMPONENTS

CROSS REFERENCE TO RELATED APPLICATIONS

This application claims priority to, and the benefit of, U.S. Provisional Patent Application Ser. No. 62/432,208, entitled "ARBITRATION OF MULTIPLE SYSTEMS USING SHARED COMPONENTS," filed on Dec. 9, 2016. The '208 application is hereby incorporated by reference in its entirety for all purposes.

FIELD

The present disclosure relates to aircraft braking systems, and more specifically, to a system and method for brake control systems.

BACKGROUND

Aircraft brake systems may include shared resources controlled by various systems. For example, an aircraft brake system may include a valve assembly controlled by an aircraft management system (AMS) and a brake control unit (BCU). In an emergency scenario where one of the shared resources fails, such as one where the BCU fails, operations previously performed by the failed resource may result in unreliable braking operations.

SUMMARY

A brake control system (BCS) is provided, comprising a first controller, a second controller in electronic communication with the first controller, a brake control module (BCM) comprising, a valve comprising a first coil and a second coil, wherein the valve is controllable via the first coil and the second coil, and the BCM is in electronic communication with the first controller via the first coil and in electronic communication with the second controller via the second coil.

In various embodiments, the BCS further comprises a tangible, non-transitory memory configured to communicate with the first controller, the tangible, non-transitory memory having instructions stored thereon that, in response to execution by the first controller, cause the first controller to perform operations comprising disabling, by the first controller, the second controller, and controlling, by the first controller, the valve, via the second coil.

In various embodiments, the first controller comprises an aircraft management system (AMS), and the second controller comprises a brake control unit (BCU).

In various embodiments, the second controller is disabled from communicating with the valve in response to the first controller disabling the second controller.

In various embodiments, the first controller is hard-wired to the BCM.

In various embodiments, the second controller is hard-wired to the BCM.

In various embodiments, the first controller is hard-wired to the second controller.

In various embodiments, the valve comprises a servo-valve (SV).

In various embodiments, the BCM meters a hydraulic pressure to a brake system component.

A brake control system (BCS) is provided, comprising a first controller, a second controller in electronic communication with the first controller, and a valve comprising a first coil and a second coil, wherein the first controller is configured to actuate the valve via the first coil, and the second controller is configured to actuate the valve via the second coil.

In various embodiments, the first controller comprises an aircraft management system (AMS).

In various embodiments, the second controller comprises a brake control unit (BCU).

In various embodiments, the second controller is disabled from actuating the valve in response to the first controller disabling the second controller.

In various embodiments, the valve is hard-wired to the first controller and hard-wired to the second controller.

In various embodiments, the first controller is hard-wired to the second controller.

In various embodiments, the valve comprises a servo valve (SV).

In various embodiments, the valve meters a hydraulic pressure to a brake system component.

In various embodiments, the BCS further comprises a shutoff valve (SOV), wherein the SOV supplies a hydraulic pressure to the valve and the valve meters the hydraulic pressure between the SOV and a brake system component.

A method for controlling a brake is provided, comprising disabling, by a first controller, a second controller from controlling a valve via a second coil, and controlling, by the first controller, the valve via a first coil, wherein the valve includes the first coil and the second coil, the valve is configured to actuate in response to an electrical energy being supplied to at least one of the first coil and the second coil, the first controller is in electronic communication with the first coil, and the second controller is in electronic communication with the second coil.

In various embodiments, the method further comprises detecting, by the first controller, a fault in the second controller, wherein the first controller disables the second controller in response to the fault being detected.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

In the context of the present disclosure, systems and methods may find particular use in connection with aircraft wheel and brake control systems. However, various aspects of the disclosed embodiments may be adapted for optimized performance with a variety of components and in a variety of systems. As such, numerous applications of the present disclosure may be realized.

In various embodiments, aircraft brake systems may include a controller, such as a BCU controller for example. The controller may be configured to control the force commanded to the braking system. In hydraulic braking systems, force may be applied via hydraulic fluid pressure. The hydraulic system may include a shut off valve that supplies hydraulic fluid pressure to the braking system generally. A servo valve, downstream of the shut off valve, may supply hydraulic fluid pressure at other portions of the braking system.

As provided herein, an AMS may be in communication with the controller, such as a BCU. In various embodiments, it may be desirable for the AMS to take full control of the braking system, for example if the BCU fails. In this regard, a redundant system is provided herein to allow the AMS to disable the BCU from control of the brake system. A brake control module (BCM) is provided herein having two coils whereby the BCM may be separately controlled. The BCU may control one or more brake control modules (BCMs), such as an inboard (IB) BCM and an outboard (OB) BCM for example. The AMS may control one or more brake control modules (BCMs), such as the IB BCM and the OB BCM for example, via a first coil of the BCMs. The AMS may control one or more BCMs via a second coil of the BCMs.

Figure 1:
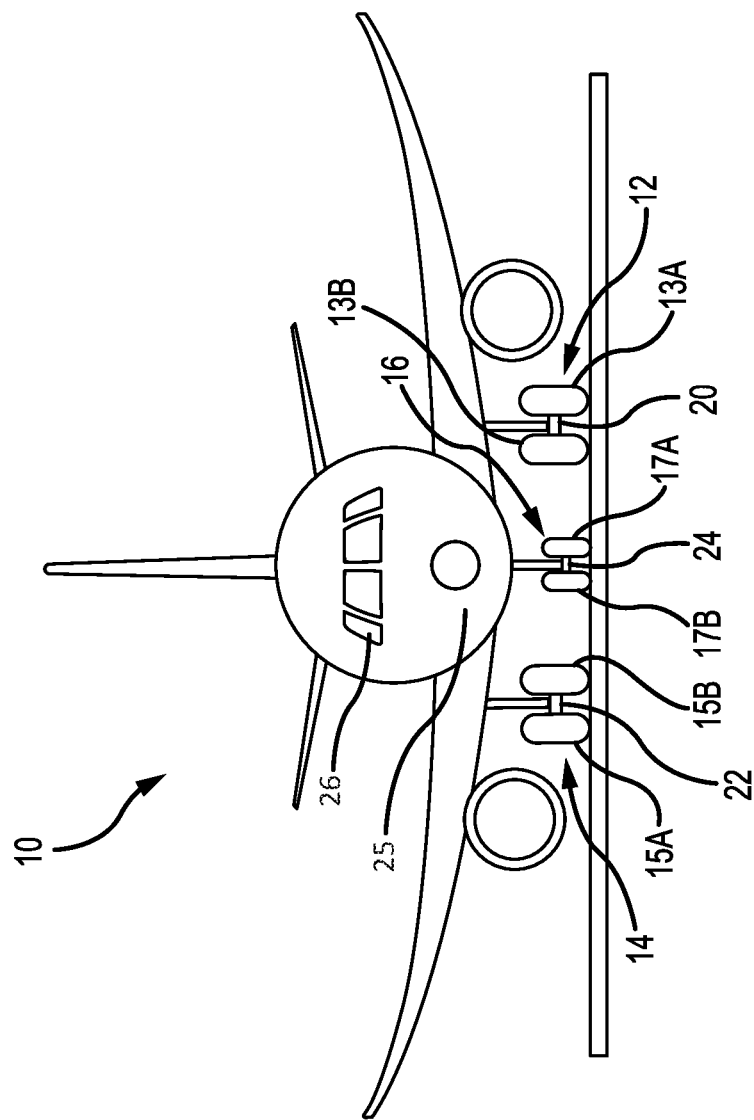
FIG. 1 illustrates an aircraft having landing gear and a controller, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels may differ from the main wheels in that the nose wheels may not include a brake and/or a wheel speed transducer. An XYZ axes is used throughout the drawings to illustrate the axial (y), forward (x) and vertical (z) directions relative to axle 22. Aircraft 10 may comprise a controller 25 and pilot controls 26. Landing gear 12 and landing gear 14 may be in communication with controller 25 and/or pilot controls 26 and may receive commands from controller 25 and/or pilot controls 26, for example, to apply pressure to a brake stack.

Figure 2:
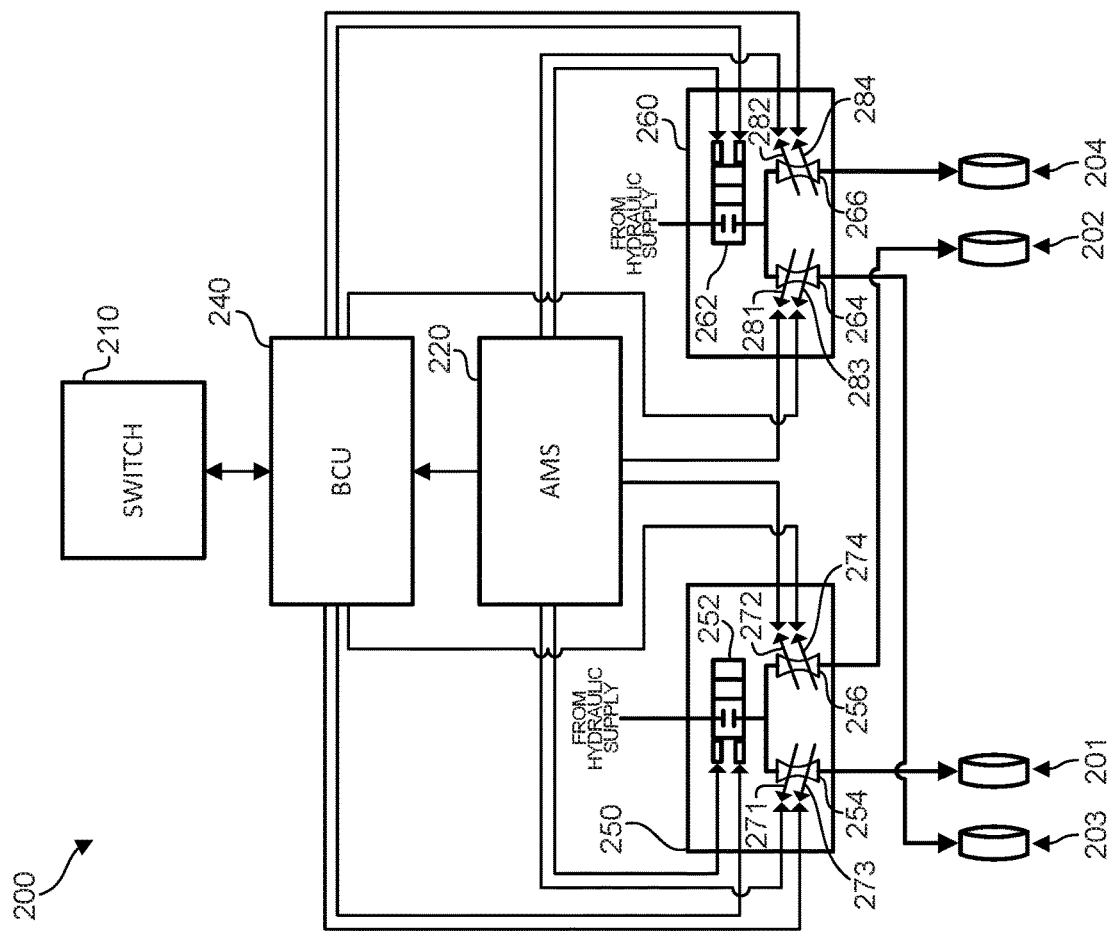
FIG. 2 illustrates a schematic view of a brake control system (BCS), in accordance with various embodiments.

With reference to FIG. 2, a brake control system (hereinafter "system 200") is illustrated. In various embodiments, system 200 may be implemented in the brake system of aircraft 10, with momentary reference to FIG. 1. System 200 may include brake control unit (BCU) (also referred to herein as a second controller) 240. In various embodiments, BCU 240 may be a controller and/or processor. In various embodiments, BCU 240 may be implemented in a single controller and/or processor. In various embodiments, BCU 240 may be implemented in multiple controllers and/or processors.

System 200 may include a switch 210. Switch 210 may comprise a switch, lever, handle, knob, pedal, or any other suitable component for selectively actuating a brake. Switch 210 may be located in a cockpit of an aircraft. BCU 240 may be in electronic communication with switch 210. BCU 240 may be controlled via switch 210.

System 200 may include an aircraft management system (AMS) 220. AMS 220 may be a system whereby a vehicle may be operated (e.g., take flight) and controlled. AMS 220 may be a system whereby a vehicle may be operated remotely, without a human aboard the vehicle to operate the vehicle. AMS 220 may be a system whereby a vehicle may be operated locally, with a human aboard the vehicle to operate the vehicle. In various embodiments, AMS 220 may be a controller and/or processor. In various embodiments, AMS 220 may be implemented in a single controller and/or processor. In various embodiments, AMS 220 may be implemented in multiple controllers and/or processors. Each controller and/or processor may control a separate valve. For example, in various embodiments, a first AMS 220 may control servo-valve (SV) (also referred to herein as a first SV) 254, a second AMS 220 may control SV (also referred to herein as a second SV) 256, a third AMS 220 may control SV (also referred to herein as a first SV) 264, and a fourth AMS 220 may control SV (also referred to herein as a second SV) 266. Furthermore, in various embodiments where there are only two AMSs 220, a first AMS 220 may control SV 254 and SV 256, and a second AMS 220 may control SV 264 and SV 266.

System 200 may include an inboard (IB) brake control module (BCM). IB BCM 250 may include a shut off valve (SOV) 252. SOV 252 may be supplied with pressurized hydraulic fluid from a hydraulic fluid supply. IB BCM 250 may include a SV 254. IB BCM 250 may include an SV 256. SOV 252 may be in fluid communication with SV 254. SOV 252 may be in fluid communication with SV 256. SOV 252 may be configured to supply SV 254 and SV 256 with pressurized hydraulic fluid in response to being in an open position. SV 254 and SV 256 may be configured to meter hydraulic fluid pressure between SOV 252 and various other brake system components, such as a brake actuator for example.

System 200 may include an outboard (OB) BCM 260. OB BCM 260 may include a shut off valve (SOV) 262. SOV 262 may be supplied with pressurized hydraulic fluid from a hydraulic fluid supply. OB BCM 260 may include SV 264. OB BCM 260 may include SV 266. SOV 262 may be in fluid communication with SV 264. SOV 262 may be in fluid communication with SV 266. SOV 262 may be configured to supply SV 264 and SV 266 with pressurized hydraulic fluid in response to being in an open position. SV 264 and SV 266 may be configured to meter hydraulic fluid pressure between SOV 262 and various other brake system components, such as a brake actuator for example.

In various embodiments, the valves as discussed herein may be replaced with various types of valves known to a person having ordinary skill in the art. In various embodiments, a shut off valve (e.g., SOV 252 and SOV 262) as provided herein may comprise a valve assembly having electronics (e.g., a solenoid) that actuates a valve in response to commands from other electronics (e.g., BCU 240 and/or AMS 220). In various embodiments, a servo-valve (e.g., SV 254, SV 256, SV 264, and SV 266) as provided herein may comprise a valve assembly having electronics (e.g., a solenoid comprising a coil) that actuates a valve in response to commands from other electronics (e.g., BCU 240 and/or AMS 220). In this regard, SOV 252, SOV 262, SV 254, SV 256, SV 264, and/or SV 266 may comprise electromechanical valves, such as solenoid valves for example. In this regard, each SV and its respective coils (e.g., SV 254, coil 271, and coil 273) may be collectively referred to herein as an electromechanical valve assembly.

In various embodiments, BCU 240 may be in electrical communication with SOV 252, SV 254, and/or SV 256. Similarly, BCU 240 may be in electrical communication with SOV 262, SV 264, and/or SV 266. In various embodiments, BCU 240 may comprise an IB brake controller for controlling IB BCM 250 and an OB brake controller for controlling OB BCM 260.

In various embodiments, AMS 220 may be hard-wired to BCU 240. BCU 240 may be hard-wired to SV 254. BCU 240 may be hard-wired to SV 256. BCU 240 may be hard-wired to SV 264. BCU 240 may be hard-wired to SV 266. AMS 220 may be hard-wired to SV 254. AMS 220 may be hard-wired to SV 256. AMS 220 may be hard-wired to SV 264. AMS 220 may be hard-wired to SV 266.

During operation, SOV 252 may be controlled by BCU 240. BCU 240 may send electrical energy (e.g., an electrical current) to SOV 252 to control the state (e.g., to open or close) of SOV 252. Similarly, SOV 262 may be controlled by BCU 240. BCU 240 may send electrical energy to SOV 262 to control the position (e.g., to open or close) of SOV 262. Furthermore, SV 254 may be controlled by BCU 240. BCU 240 may send electrical energy to SV 254 to control the position of SV 254. SV 256 may be controlled by BCU 240. BCU 240 may send electrical energy to SV 256 to control the position of SV 256. SV 264 may be controlled by BCU 240. BCU 240 may send electrical energy to SV 264 to control the position of SV 264. SV 266 may be controlled by BCU 240. BCU 240 may send electrical energy to SV 266 to control the position of SV 266.

In various embodiments, the state of SOV 252 may be controlled by sending an electrical energy (e.g., an electrical current) to a coil (e.g., a solenoid) of SOV 252 which may consequently actuate SOV 252 between an opened and closed position. The state of SOV 262 may be similarly controlled. In various embodiments, the position of SV 254 may be controlled by sending an electrical energy (e.g., an electrical current) to a coil (e.g., coil 271 and/or coil 273) which may consequently actuate SV 254 between an opened and closed position. The position of SV 256, SV 264, and/or SV 266 may be similarly controlled.

Typically, a servo-valve comprises a moveable core and a coil. Servo-valves of the present disclosure may comprise a moveable core and two independently controlled coils.

In various embodiments, SV 254 may comprise a coil (also referred to herein as a first coil) 271 and a coil (also referred to herein as a second coil) 273. SV 254 may be in electric communication with BCU 240 via coil 273. BCU 240 may actuate SV 254 via coil 273. In various embodiments, SV 256 may comprise a coil (also referred to herein as a first coil) 272 and a coil (also referred to herein as a second coil) 274. SV 256 may be in electric communication with BCU 240 via a coil 274. BCU 240 may actuate SV 256 via coil 274. In this regard, hydraulic pressure may be supplied to a first IB wheel brake 201 via SV 254 and hydraulic pressure may be supplied to a second IB wheel brake 202 via SV 256.

In various embodiments, SV 264 may comprise a coil (also referred to herein as a first coil) 281 and a coil (also referred to herein as a second coil) 283. SV 264 may be in electric communication with BCU 240 via coil 283. BCU 240 may actuate SV 264 via coil 283. In various embodiments, SV 266 may comprise a coil (also referred to herein as a first coil) 282 and a coil (also referred to herein as a second coil) 284. SV 266 may be in electric communication with BCU 240 via a coil 284. BCU 240 may actuate SV 266 via coil 284. In this regard, hydraulic pressure may be supplied to a first OB wheel brake 203 via SV 264 and hydraulic pressure may be supplied to a second OB wheel brake 204 via SV 266.

In various embodiments, coil 271, coil 272, coil 273, coil 274, coil 281, coil 282, coil 283, and/or coil 284 may comprise a solenoid. With particular focus on SV 254, SV 254 may be moved between an open position and a closed position by sending an electrical current, for example a current of between zero and fifty milliamps (0-50 mA), to generate a magnetic field which may move a moveable core (e.g., a plunger) of SV 254.

In various embodiments, it may be desirable for AMS 220 to take over control of IB BCM 250 and/or OB BCM 260, for example, in response to a fault in BCU 240, coil 273, coil 274, coil 283, and/or coil 284. In this regard AMS 220 may comprise a fault detection logic configured to monitor and detect a fault (e.g., an open circuit condition, a short circuit condition, an unresponsive condition, etc.) in BCU 240, coil 273, coil 274, coil 283, and/or coil 284. AMS 220 may comprise a fault detection logic comprising a watchdog timer to detect a fault, or malfunction, in BCU 240. In various embodiments, AMS 220 may be configured to take over control of IB BCM 250 and/or OB BCM 260 in response to BCU 240 detecting a fault in BCU 240, coil 273, coil 274, coil 283, and/or coil 284. In this regard, BCU 240 may comprise a fault detection logic. In various embodiments, AMS 220 may be configured to take over control of IB BCM 250 and/or OB BCM 260 in response to a pilot command, a remote command, or any other suitable command received from on-board or off-board the vehicle. AMS 220 may be configured to disable control of IB BCM 250 and/or OB BCM 260 by BCU 240. AMS 220 may be configured to send a disable signal to BCU 240. BCU 240 may be disabled from actuating SV 254, SV 256, SV 264, and/or SV 266 in response to the disable signal. In various embodiments, BCU 240 may be configured to shut down in response to receiving the disable signal from AMS 220. However, BCU 240 may be configured to perform any suitable operation to disable control of IB BCM 250 and/or OB BCM 260 in response to receiving the disable signal from AMS 220.

In various embodiments, SOV 252 may be controlled by AMS 220. AMS 220 may send electrical energy to SOV 252 to control the state of SOV 252. Similarly, SOV 262 may be controlled by AMS 220. AMS 220 may send electrical energy to SOV 262 to control the position of SOV 262. Furthermore, SV 254 may be controlled by AMS 220. AMS 220 may send electrical energy to SV 254 to control the position of SV 254. SV 256 may be controlled by AMS 220. AMS 220 may send electrical energy to SV 256 to control the position of SV 256. SV 264 may be controlled by AMS 220. AMS 220 may send electrical energy to SV 264 to control the position of SV 264. SV 266 may be controlled by AMS 220. AMS 220 may send electrical energy to SV 266 to control the position of SV 266.

In various embodiments, SV 254 may be in electric communication with AMS 220 via a coil (also referred to herein as a first coil) 271. AMS 220 may actuate SV 254 via coil 271. SV 256 may be in electric communication with AMS 220 via a coil 272. AMS 220 may actuate SV 256 via coil 272. In this regard, hydraulic pressure may be supplied to first IB wheel brake 201 via SV 254 and hydraulic pressure may be supplied to second IB wheel brake 202 via SV 256.

In various embodiments, SV 264 may be in electric communication with AMS 220 via a coil (also referred to herein as a first coil) 281. AMS 220 may actuate SV 264 via coil 281. SV 266 may be in electric communication with AMS 220 via a coil 282. AMS 220 may actuate SV 266 via coil 282. In this regard, hydraulic pressure may be supplied to first OB wheel brake 203 via SV 264 and hydraulic pressure may be supplied to second OB wheel brake 204 via SV 266.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

BCU 240 and/or AMS 220 may comprise a non-transitory memory. BCU 240 and/or AMS 220 may comprise instructions stored in memory.

Figure 3:
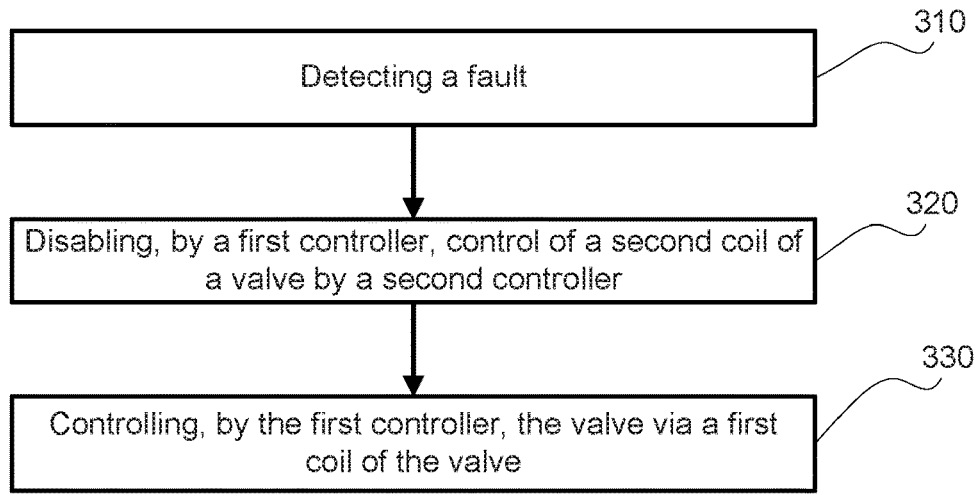
FIG. 3 illustrates a method for controlling a brake, in accordance with various embodiments.

With reference to FIG. 3, a method 300 for controlling a brake is illustrated, in accordance with various embodiments. Method 300 includes detecting a fault (step 310). Method 300 includes disabling, by a first controller, control of a second coil of a valve by a second controller (step 320). Method 300 includes controlling, by the first controller, the valve via a first coil of the valve (step 330).

With combined reference to FIG. 2 and FIG. 3, step 310 may include detecting, by AMS 220, a fault in BCU 240, coil 273, coil 274, coil 283, and/or coil 284. Step 320 may include disabling, by AMS 220, control of coil 273, coil 274, coil 283, and/or coil 284 by BCU 240. Step 330 may include controlling, by AMS 220, SV 254 via coil 271, SV 256 via coil 272, SV 264 via coil 281, and/or SV 266 via coil 282.

Figure 4:
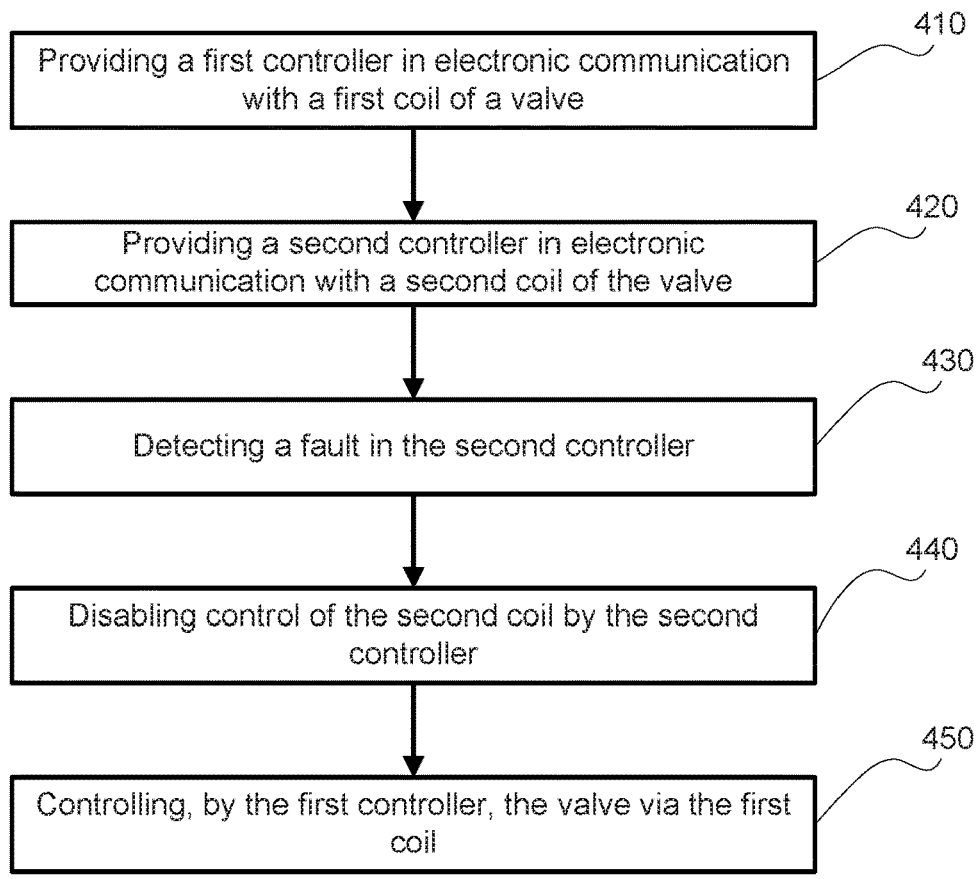
FIG. 4 illustrates a method for controlling a brake, in accordance with various embodiments.

With reference to FIG. 4, a method 400 for controlling a brake is illustrated, in accordance with various embodiments. Method 400 includes providing a first controller in electronic communication with a first coil of a valve (step 410). Method 400 includes providing a second controller in electronic communication with a second coil of the valve (step 420). Method 400 includes detecting a fault in the second controller (step 430). Method 400 includes disabling control of the second coil by the second controller (step 440). Method 400 includes controlling, by the first controller, the valve via the first coil (step 450).

With combined reference to FIG. 2 and FIG. 4, step 410 may include providing AMS 220 in electronic communication with coil 271, coil 272, coil 281, and/or coil 282. Step 420 may include providing BCU 240 in electronic communication with coil 273, coil 274, coil 283, and/or coil 284. Step 430 may include detecting a fault in BCU 240, coil 273, coil 274, coil 283, and/or coil 284. Step 440 may include disabling, by AMS 220, control of coil 273, coil 274, coil 283, and/or coil 284 by BCU 240. Step 450 may include controlling, by AMS 220, SV 254 via coil 271, SV 256 via coil 272, SV 264 via coil 281, and/or SV 266 via coil 282.

Although a brake control system and method have been described in association with an aircraft as an embodiment, brake control systems and methods of the present disclosure may also be associate with other vehicles, such as automotive, watercraft, railed vehicles, spacecraft, and the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35

U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake control system (BCS), comprising:
   a first controller;
   a second controller in electronic communication with the first controller;
   a brake control module (BCM) comprising:
     a valve, comprising:
       a first coil; and
       a second coil;
   wherein the valve is controllable via the first coil and the second coil,
   the BCM is in electronic communication with the first controller via the first coil and in electronic communication with the second controller via the second coil, and
   the first controller is configured to disable the second controller from control of the valve.

2. The BCS of claim 1, further comprising a tangible, non-transitory memory configured to communicate with the first controller, the tangible, non-transitory memory having instructions stored thereon that, in response to execution by the first controller, cause the first controller to perform operations comprising:
   disabling, by the first controller, the second controller; and
   controlling, by the first controller, the valve, via the second coil.

3. The BCS of claim 1, wherein the first controller comprises an aircraft management system (AMS), and the second controller comprises a brake control unit (BCU).

4. The BCS of claim 1, wherein the second controller is disabled from communicating with the valve in response to the first controller disabling the second controller.

5. The BCS of claim 1, wherein the first controller is hard-wired to the BCM.

6. The BCS of claim 1, wherein the second controller is hard-wired to the BCM.

7. The BCS of claim 1, wherein the first controller is hard-wired to the second controller.

8. The BCS of claim 1, wherein the valve comprises a servo-valve (SV).

9. The BCS of claim 1, wherein the BCM meters a hydraulic pressure to a brake system component.

10. A brake control system (BCS), comprising:
    a first controller;
    a second controller in electronic communication with the first controller; and
    a valve comprising a first coil and a second coil,
    wherein the first controller is configured to actuate the valve via the first coil,
    the second controller is configured to actuate the valve via the second coil, and
    the first controller is configured to disable the second controller from control of the valve.

11. The BCS of claim 10, wherein the first controller comprises an aircraft management system (AMS).

12. The BCS of claim 10, wherein the second controller comprises a brake control unit (BCU).

13. The BCS of claim 10, wherein the second controller is disabled from actuating the valve in response to the first controller disabling the second controller.

14. The BCS of claim 10, wherein the valve is hard-wired to the first controller and hard-wired to the second controller.

15. The BCS of claim 10, wherein the first controller is hard-wired to the second controller.

16. The BCS of claim 10, wherein the valve comprises a servo valve (SV).

17. The BCS of claim 10, wherein the valve meters a hydraulic pressure to a brake system component.

18. The BCS of claim 10, further comprising a shutoff valve (SOV), wherein the SOV supplies a hydraulic pressure to the valve and the valve meters the hydraulic pressure between the SOV and a brake system component.

19. A method for controlling a brake, comprising:
    disabling, by a first controller, a second controller from controlling a valve via a second coil; and
    controlling, by the first controller, the valve via a first coil;
    wherein the valve includes the first coil and the second coil,
    the valve is configured to actuate in response to an electrical energy being supplied to at least one of the first coil and the second coil,
    the first controller is in electronic communication with the first coil, and
    the second controller is in electronic communication with the second coil.

20. The method of claim 19, further comprising detecting, by the first controller, a fault in the second controller, wherein the first controller disables the second controller in response to the fault being detected.

* * * * *